(12) United States Patent
Skacel et al.

(10) Patent No.: US 10,411,507 B2
(45) Date of Patent: Sep. 10, 2019

(54) CIRCUIT ARRANGEMENT

(71) Applicant: Infineon Technologies AG, Neubiberg (DE)

(72) Inventors: Georg Skacel, Graz (AT); Stephan Rampetzreiter, Graz (AT)

(73) Assignee: Infineon Technologies AG, Neubiberg (DE)

( * ) Notice: Subject to any disclaimer, the term of this patent is extended or adjusted under 35 U.S.C. 154(b) by 220 days.

(21) Appl. No.: 15/208,661

(22) Filed: Jul. 13, 2016

(65) Prior Publication Data

US 2017/0018353 A1 Jan. 19, 2017

(30) Foreign Application Priority Data

Jul. 14, 2015 (DE) .................. 10 2015 111 389

(51) Int. Cl.
| | |
|---|---|
| *H01F 38/14* | (2006.01) |
| *H02J 50/05* | (2016.01) |
| *H02J 50/10* | (2016.01) |
| *H04B 5/00* | (2006.01) |

(52) U.S. Cl.
CPC ............ *H02J 50/10* (2016.02); *H04B 5/0031* (2013.01); *H04B 5/0012* (2013.01); *H04B 5/0075* (2013.01)

(58) Field of Classification Search
None
See application file for complete search history.

(56) References Cited

U.S. PATENT DOCUMENTS

| | | | | |
|---|---|---|---|---|
| 2010/0264747 | A1* | 10/2010 | Hall ...................... | H02J 17/00 307/104 |
| 2014/0138439 | A1 | 5/2014 | Jurisch et al. | |
| 2014/0159653 | A1 | 6/2014 | Von Novak et al. | |
| 2015/0061398 | A1* | 3/2015 | Kudo ................... | H04B 5/0037 307/104 |
| 2017/0256979 | A1* | 7/2017 | Van Novak ............ | H02J 7/02 307/104 |

FOREIGN PATENT DOCUMENTS

| | | |
|---|---|---|
| DE | 2746419 A1 | 5/1978 |
| DE | 102012102941 A1 | 10/2013 |
| DE | 102012221016 A1 | 5/2014 |
| DE | 102013107003 A1 | 1/2015 |
| EP | 1708545 A2 | 10/2006 |
| GB | 1538623 A | 1/1979 |

* cited by examiner

*Primary Examiner* — Jared Fureman
*Assistant Examiner* — Aqeel H Bukhari
(74) *Attorney, Agent, or Firm* — Viering, Jentschura & Partner MBB

(57) ABSTRACT

In accordance with various embodiments, a circuit arrangement may include a first circuit, which is designed for contactless communication, and a second circuit, which is designed in accordance with a predefined functionality. The circuit arrangement may further include at least one electronic component which in a first operating mode together with the first circuit implements the contactless communication and in a second operating mode together with the second circuit implements the predefined functionality.

18 Claims, 10 Drawing Sheets

CIRCUIT ARRANGEMENT

CROSS-REFERENCE TO RELATED APPLICATION

This application claims priority to German Patent Application Serial No. 10 2015 111 389.9, which was filed Jul. 14, 2015, and is incorporated herein by reference in its entirety.

TECHNICAL FIELD

Various embodiments relate generally to a circuit arrangement.

BACKGROUND

Contactless communication generally enables the contactless exchange of data, e.g. in the form of instructions or information. Depending on the application, contactless communication necessitates communication component parts (e.g. antennas) which are specifically developed and optimized for the respective application. In contrast to standard applications which enable recourse to be able to be had to known solutions (which are slightly modified, if appropriate), in individual applications (i.e. e.g. applications in small numbers) it is necessary to use in each case communication component parts adapted to the application. This often requires an exact knowledge of the respective application, of the communication component parts in question, and increases the required time and the complexity, which can lead to high costs.

By way of example, each individual application predefines specific boundary conditions (e.g. size and/or geometry), which makes it necessary to develop prototypes and to test them. In this case, firstly a great deal of complexity is involved in the development of the prototypes, for example by designing, drawing, simulating, etc., and secondly the construction thereof often requires individual fabrication, which may be lengthy. This results in delays until the prototypes are fabricated, which are subsequently tested. If the prototypes do not satisfy the demanded boundary conditions, the process begins anew, which ties up resources (e.g. time and personnel) and causes high costs.

SUMMARY

In accordance with various embodiments, a circuit arrangement may include a first circuit, which is designed for contactless communication, and a second circuit, which is designed in accordance with a predefined functionality. The circuit arrangement may further include at least one electronic component which in a first operating mode together with the first circuit implements the contactless communication and in a second operating mode together with the second circuit implements the predefined functionality.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1A:
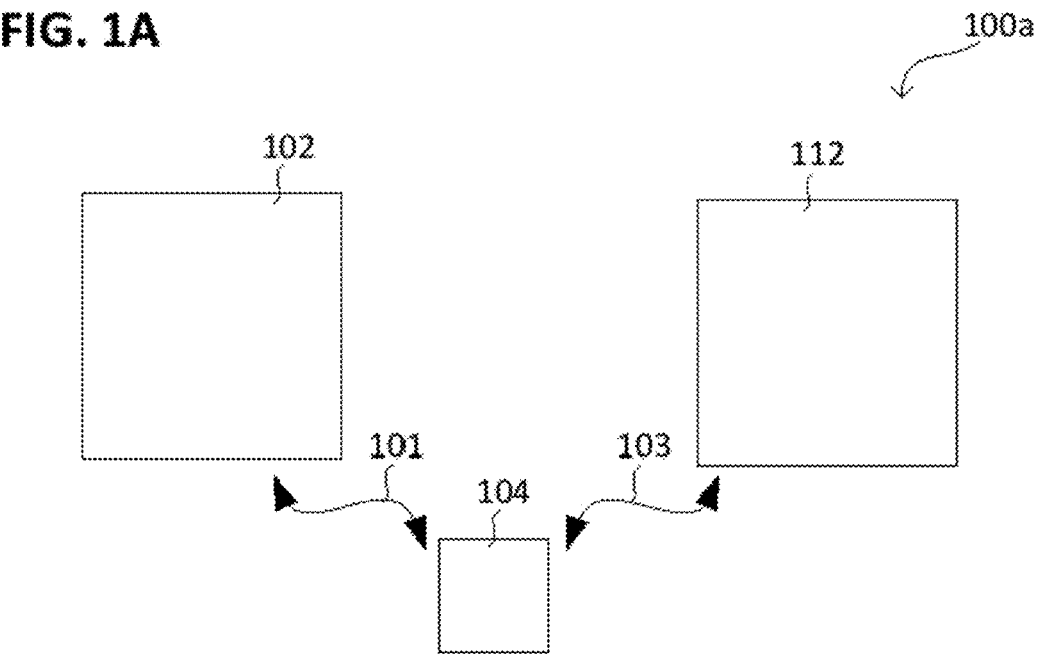
FIGS. 1A and 1B in each case show a circuit arrangement in accordance with various embodiments in a schematic view.

The following detailed description refers to the accompanying drawings that show, by way of illustration, specific details and embodiments in which the invention may be practiced.

In the following detailed description, reference is made to the accompanying drawings, which form part of this description and show for illustration purposes specific embodiments in which the invention can be implemented. In this regard, direction terminology such as, for instance, "at the top", "at the bottom", "at the front", "at the back", "front", "rear", etc. is used with respect to the orientation of the figure(s) described. Since components of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various exemplary embodiments described herein can be combined with one another, unless specifically indicated otherwise. Therefore, the following detailed description should not be interpreted in a restrictive sense, and the scope of protection of the present invention is defined by the appended claims.

In the context of this description, the terms "connected" and "coupled" are used to describe both a direct and an indirect connection and a direct or indirect coupling. In the figures, identical or similar elements are provided with identical reference signs, insofar as this is expedient.

Conventionally there are many electrical component elements (e.g. having a respective inductance) whose field of application is e.g. filtering (e.g. frequency filtering). These electrical component elements may have parasitic effects which, in conventional operation, are not required or are even undesired, e.g. in the case of a coil the formation of a magnetic field. The intensity of said parasitic effects depends on the geometrical construction of the respective electrical component element.

In accordance with various embodiments, said parasitic effects can be used for producing a circuit arrangement which implements a contactless communication. For this purpose, a first electrical circuit can be used, which implements a contactless communication using the parasitic effect, e.g. in the form of a smart card controller.

In the case where the first electrical circuit has a form (e.g. includes or is formed from a smart card controller) which is also used in smart cards, the circuit arrangement can also be designed as "embedded smart card" or "smart device". In accordance with various embodiments, a smart device can be understood to mean a smart card controller (only the chip itself) which is arranged on a printed circuit board (also designated as circuit board) and/or in a device which conventionally is not used as a smart card (e.g. bank account card, passport, etc.). The printed circuit board can be e.g. part of the device.

In accordance with various embodiments, the first electrical circuit may include or be formed from a contactless-only controller. The contactless-only controller may include (e.g. exclusively) an input/output interface in the form of a contactless communication interface (which is designed for contactless communication).

Alternatively, the first electrical circuit may include or be formed from a dual-interface controller (which includes two input/output interfaces) and/or include or be formed from a multi-interface controller (which includes more than two input/output interfaces). The dual-interface controller and/or the multi-interface controller may include at least one first input/output interface in the form of a contactless communication interface (which is designed for contactless communication) and may include an at least second input/output interface in the form of a contact communication interface (also designated as contact-based interface, e.g. a contact-implemented communication interface) (which is designed for contact-based communication).

FIG. 1A illustrates a circuit arrangement 100a in accordance with various embodiments in a schematic view.

In accordance with various embodiments, the circuit arrangement 100a may include a first circuit 102, which is designed for contactless communication (can also be designated as wireless transfer method). Furthermore, the circuit arrangement 100a may include a second circuit 112, which is designed in accordance with a predefined functionality.

In addition, the circuit arrangement 100a may include at least one electronic component 104, which is optionally coupled 101, 103 to the first circuit 102 and/or the second circuit 112. In other words, the electronic component 104 can be both coupled 101 to the first circuit 102 and coupled 103 to the second circuit 112 or can be coupled correspondingly only to one of the circuits 102, 112.

The electronic component 104 can be coupled 101 to the first circuit 102 in such a way (i.e. by means of a first coupling 101) that in a first operating mode together with the first circuit 102 it implements the contactless communication. In accordance with various embodiments, the contactless communication can be effected using an alternating field (e.g. an alternating magnetic field and/or an alternating electric field) (i.e. can be based on the alternating field).

The alternating field (e.g. the alternating magnetic field and/or the alternating electric field) can be transferred by a transmitter/receiver pair. By way of example, an electrical signal can be converted into an alternating field by means of the transmitter (i.e. the transmitter generates the alternating field from the electrical signal and emits said alternating field) and the alternating field can be converted into a different electrical signal by means of the receiver (i.e. the receiver takes up the alternating field and generates the different electrical signal therefrom). In the case of a capacitive coupling, the transmitter and/or the receiver may include or be formed from at least one capacitor. In the case of an inductive coupling, the transmitter and/or the receiver may include or be formed from at least one coil.

In accordance with various embodiments, the electronic component 104 (in at least the first operating mode) can be designed for operation as transmitter or as receiver. In this case, the contactless communication can be effected only in one direction, i.e. unidirectionally (unidirectional contactless communication).

In accordance with various embodiments, the electronic component 104 (in at least the first operating mode) can be designed for operation as transmitter and as receiver (i.e. as transfer unit, e.g. as antenna). In this case, the contactless communication can be effected in both directions, i.e. bidirectionally (bidirectional contactless communication), e.g. simultaneously or successively. Illustratively, the electronic component 104 can be designed for operation as an antenna in the first operating mode.

By way of example, the first circuit 102 together with the electronic component 104 can be designed or operated as a transponder, e.g. at least in the first operating mode. By way of example, the first circuit may include or be formed from an RFID chip (radio-frequency identification chip).

In accordance with various embodiments, the contactless communication can provide a transfer of signals, e.g. in the form of electrical energy and/or data, e.g. on the basis of the alternating field.

The alternating field can have a frequency (also designated as carrier frequency) in a range of approximately 3 MHz to approximately 30 MHz (high frequency), e.g. in a range of approximately 10 MHz to approximately 20 MHz, e.g. approximately 13.56 MHz. Alternatively, the alternating field can have a frequency (also designated as carrier frequency) in a range of approximately 850 MHz to approximately 950 MHz (ultra-high frequency), e.g. approximately 868 MHz.

In accordance with various embodiments, the electronic component 104 can be coupled 103 to the second circuit 112 in such a way (i.e. by a second coupling 103) that in a second operating mode together with the second circuit 112 it implements the predefined functionality.

By way of example, the first coupling 101 (between the electronic component 104 and the first circuit 102) and/or the second coupling 103 (between the electronic component 104 and the second circuit 112) may include or be formed from an optical coupling, a capacitive coupling, an electrically conductive coupling and/or an inductive coupling. In other words, the electronic component 104 can be optically coupled 101, electrically conductively coupled 101, inductively coupled 101 and/or capacitively coupled 101 to the first circuit 102 and/or the electronic component 104 can be optically coupled 103, electrically conductively coupled 103, inductively coupled 103 and/or capacitively coupled 103 to the second circuit 112.

The first coupling 101 can be effected for example by means of a first frequency and/or in a first frequency range. In other words, by the first coupling 101, a signal (e.g. an electrical signal or an alternating field) can be transferred (e.g. in the first operating mode) which has the first frequency and/or a frequency from the first frequency range (e.g. for operation of the first circuit 102).

The second coupling 103 can be effected for example by means of a second frequency and/or in a second frequency range. In other words, by the second coupling 103, a second signal (e.g. an electrical signal or an alternating field) can be transferred (e.g. in the second operating mode) which has the second frequency and/or a frequency from the second frequency range (e.g. for operation of the second circuit 112).

Figure 1B:
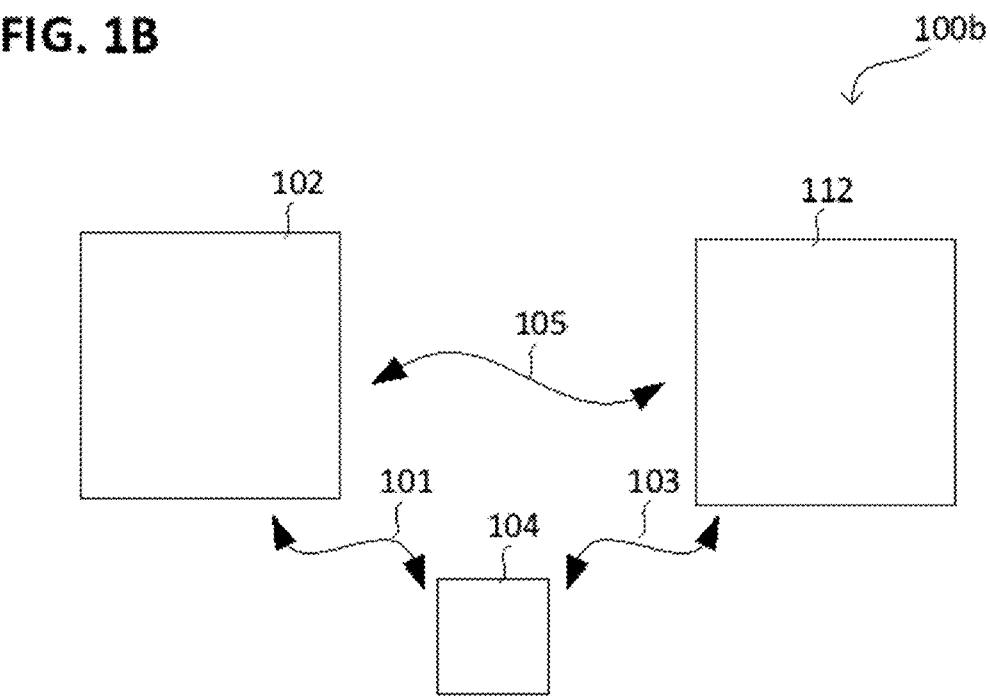

FIG. 1B illustrates a circuit arrangement 100b in accordance with various embodiments in a schematic view.

In accordance with various embodiments, the first circuit 102 can be coupled 105 to the second circuit 112, e.g. optically coupled 105, electrically conductively coupled 105, inductively coupled 105 and/or capacitively coupled 105.

Figure 2A:
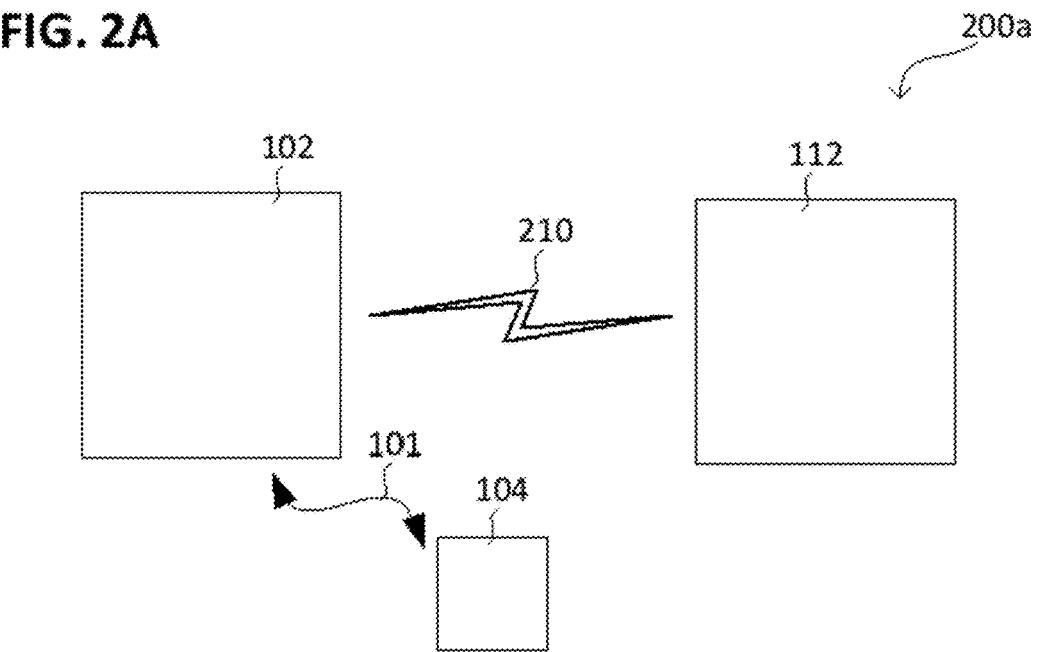
FIGS. 2A and 2B in each case show a circuit arrangement in accordance with various embodiments in a schematic view.

FIG. 2A illustrates a circuit arrangement 200a in accordance with various embodiments in a schematic view in a method for operating a circuit arrangement in accordance with various embodiments.

In accordance with various embodiments, the electronic component 104 at least in a first operating mode can be coupled 101 to the first circuit 102. In the first operating mode, the electronic component 104 can furthermore be designed or operated as transmitter and/or receiver. In that case, the electronic component 104 can be designed for transferring (transmitting and/or receiving) an alternating field, e.g. for implementing the contactless communication, e.g. using the alternating field.

For this purpose, the electronic component 104 can be coupled at least to an input/output interface of the first circuit 102, e.g. to a contactless communication interface of the first circuit 102, e.g. electrically conductively.

For contactless communication in the first operating mode, the electronic component 104 can convert an alternating electric field into a first electrical signal, which the electronic component 104 transfers to the first circuit 102 (can also be designated as receiving). The first electrical signal may include data and/or electrical energy for supplying the first circuit 102. By way of example, the electrical signal may include or be formed from a carrier signal (e.g. having the carrier frequency) for transferring electrical energy and/or a data signal (e.g. a frequency-modulated and/or amplitude-modulated data signal) for transferring data.

The data can then be processed (i.e. processed further) in the first circuit 102, e.g. by an energy supply unit, a digital/analog converter and/or a processor.

By way of example, the electronic component 104 (e.g. in the first operating mode) can be designed for electrically supplying the first circuit 102. Alternatively or additionally, the electronic component 104 (e.g. in the first operating mode) can be designed for transferring data (also designated as communicating) to the first circuit 102.

In accordance with various embodiments, the first circuit 102 and the second circuit 112 can communicate with one another, or at least exchange signals electrically, e.g. bidirectionally or at least unidirectionally. For this purpose, the first circuit 102 and the second circuit 112 can have a connection 210, e.g. a wireless connection, e.g. a radio connection.

Figure 2B:
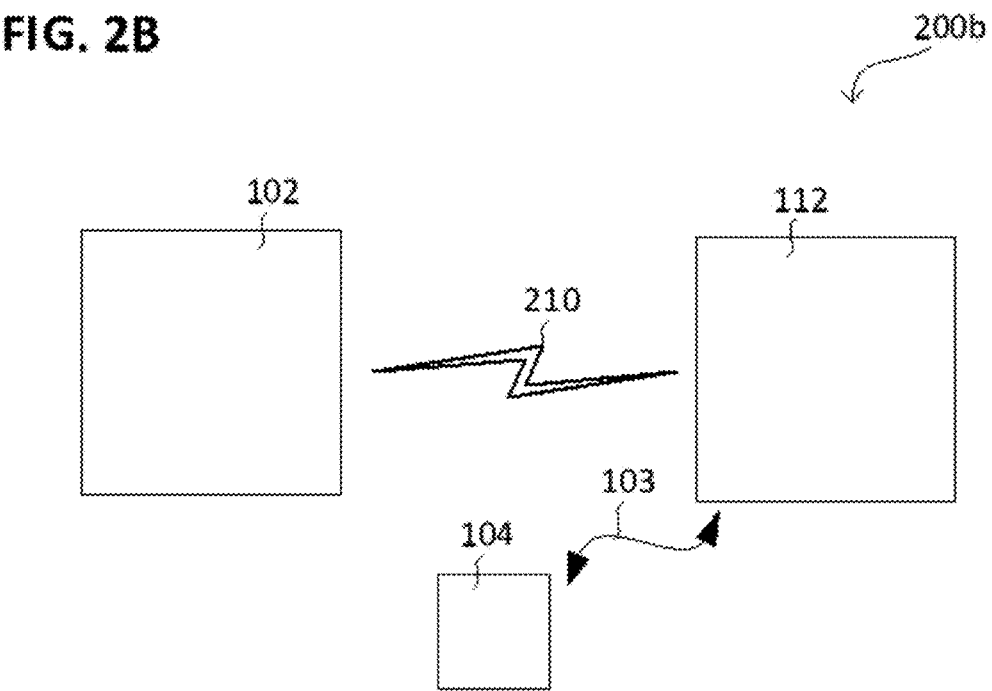

FIG. 2B illustrates a circuit arrangement 200b in accordance with various embodiments in a schematic view in a method for operating a circuit arrangement in accordance with various embodiments.

In accordance with various embodiments, the electronic component 104 at least in a second operating mode can be coupled 101 to the second circuit 102. In the second operating mode, electrical energy (e.g. on the basis of the second electrical signal) can be transferred between the electronic component 104 and the second circuit 102, e.g. for implementing the predefined functionality.

By way of example, the second circuit 102 and the electronic component 104 at least in a second operating mode can form a common signal path (which can be e.g. closed). By way of example, along the signal path, a second electrical signal can be transferred from the second circuit 102 to the electronic component 104 and/or from the electronic component 104 to the second circuit 102. By way of example, along the signal path, the second electrical signal can be transferred (e.g. exchanged) between the second circuit 102 and the electronic component 104 (e.g. repeatedly). By way of example, the second circuit 102 can be designed for generating and/or converting the second electrical signal.

In accordance with various embodiments, it is possible to switch between the first operating mode and the second operating mode, e.g. by a switch and/or by a transfer (e.g. an inquiry signal) to the first circuit 112 on the basis of the contactless communication.

In accordance with various embodiments, a first frequency (or a first frequency range) by which the electronic component 104 is coupled to the first circuit 102 (e.g. in the first operating mode) can be different than a second frequency (or a second frequency range) by which the electronic component 104 is coupled to the second circuit 112 (e.g. in the second operating mode). This can make it possible to operate a circuit arrangement simultaneously in the first operating mode and the second operating mode.

By way of example, the second circuit 112 can be operated by DC current, i.e. it can be designed as a DC current circuit, such that an electrical DC current signal is transferred along the signal path, e.g. at least in the second operating mode. Alternatively, the second circuit 112 can be operated by AC current, i.e. it can be designed as an AC current circuit, such that an electrical AC current signal is transferred along the signal path, e.g. at least in the second operating mode.

By way of example, the second circuit 112 can be designed for operation in a frequency range (the second frequency range) of approximately 1 Hz to approximately 1 MHz, e.g. in a frequency range of approximately 1 kHz to approximately 0.5 MHz, e.g. in a frequency range of approximately 10 kHz to approximately 200 kHz, e.g. approximately 150 kHz. In other words, the electrical signal for operation of the second circuit 112 (also designated as second electrical signal) can have at least a frequency from a frequency range (e.g. the second frequency range) of approximately 1 Hz to approximately 1 MHz, e.g. in a frequency range of approximately 1 kHz to approximately 0.5 MHz, e.g. in a frequency range of approximately 10 kHz to approximately 200 kHz, e.g. approximately 150 kHz. In accordance with various embodiments, the second electrical signal can be sinusoidal or else have a different shape.

Figure 3A:
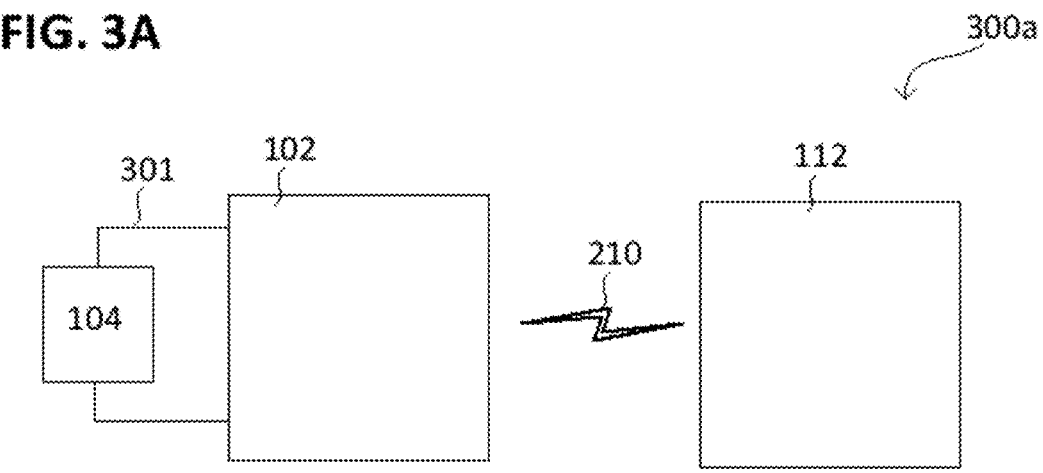
FIGS. 3A and 3B in each case show a circuit arrangement in accordance with various embodiments in a schematic view.

FIG. 3A illustrates a circuit arrangement 300a in accordance with various embodiments in a schematic view.

In accordance with various embodiments, the electrical component 104 can be electrically conductively connected to the first circuit 102, e.g. by an electrically conductive connection 301, e.g. an electrical line (also designated as electrical conductor).

The electrically conductive connection 301 can electrically conductively connect e.g. the input/output interface (e.g. a contactless communication interface) of the first circuit 102 to the electrical component 104. By way of example, the electrically conductive connection 301 may include or be formed from a cable or include or be formed from a conductor track (e.g. as part of a circuit board).

In accordance with various embodiments, at least the first circuit 102 and the second circuit 112 can be galvanically isolated from one another. In that case, the electrical component 104 can be e.g. optically, inductively and/or capacitively coupled to the second circuit 112 (e.g. at least in the second operating mode).

In accordance with various embodiments, the first circuit 102 and the second circuit 112 can communicate with one another, or at least exchange signals electrically, e.g. bidirectionally or at least unidirectionally. For this purpose, the first circuit 102 and the second circuit 112 can have a connection 210, e.g. a wireless connection, e.g. a radio connection.

Figure 3B:
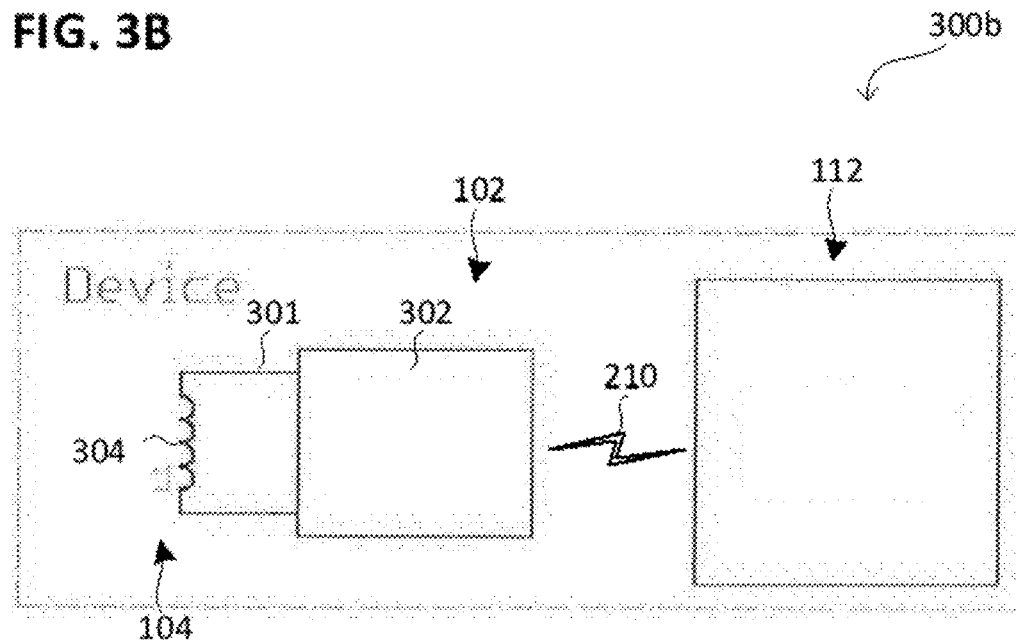

FIG. 3B illustrates a circuit arrangement 300b in accordance with various embodiments in a schematic view.

In accordance with various embodiments, the first circuit 102 may include or be formed from a chip 302 (e.g. a security chip) and the electrical component 104 may include or be formed from a coil 304. The coil 304 can have an inductance L1. The coil 304 can be designed or operated as an antenna e.g. in the first operating mode.

The inductance L1 can have a value in a range of approximately 1 nH to approximately 100 µH, e.g. in a range of approximately 10 nH to approximately 10 µH, e.g. in a range of approximately 100 nH to approximately 1 µH or in a range of approximately 10 nH to approximately 100 nH or in a range of approximately 1 µH to approximately 10 µH.

The first circuit 102, or the chip 302 (e.g. in the form of a security chip—a so-called "secure element"), can be designed for storing security data (e.g. authentication data, identification data or key data) and for communicating the latter, e.g. to a contactless controller. For this purpose, the first circuit 102 may include a memory element for storing the security data and may include an encryption processor for providing encryption services (e.g. for encrypting and/or decrypting data).

The second circuit 112 can be designed in accordance with a predefined application, i.e. in accordance with a predefined functionality, e.g. a filter application (filter functionality) or a switching application (switching).

Figure 4A:
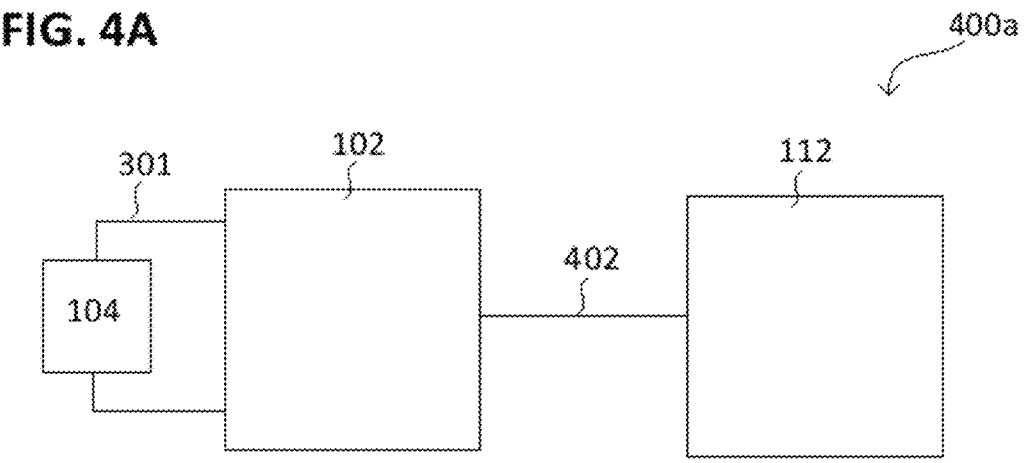
FIGS. 4A and 4B in each case show a circuit arrangement in accordance with various embodiments in a schematic view.

FIG. 4A illustrates a circuit arrangement 400a in accordance with various embodiments in a schematic view.

In accordance with various embodiments, the first circuit 102 and the second circuit 112 can be electrically conductively connected to one another, e.g. by an electrically conductive connection 402.

The electrically conductive connection 402 can electrically conductively connect e.g. input/output interface (e.g. a contact-based interface, also designated as contact communication interface) of the first circuit 102 to the electrical component 104. By way of example, the electrically conductive connection 402 may include or be formed from a cable or include or be formed from a conductor track (e.g. as part of a circuit board).

In other words, the first circuit 102 can optionally be designed for contact communication (e.g. in the case of a dual-interface controller).

Figure 4B:
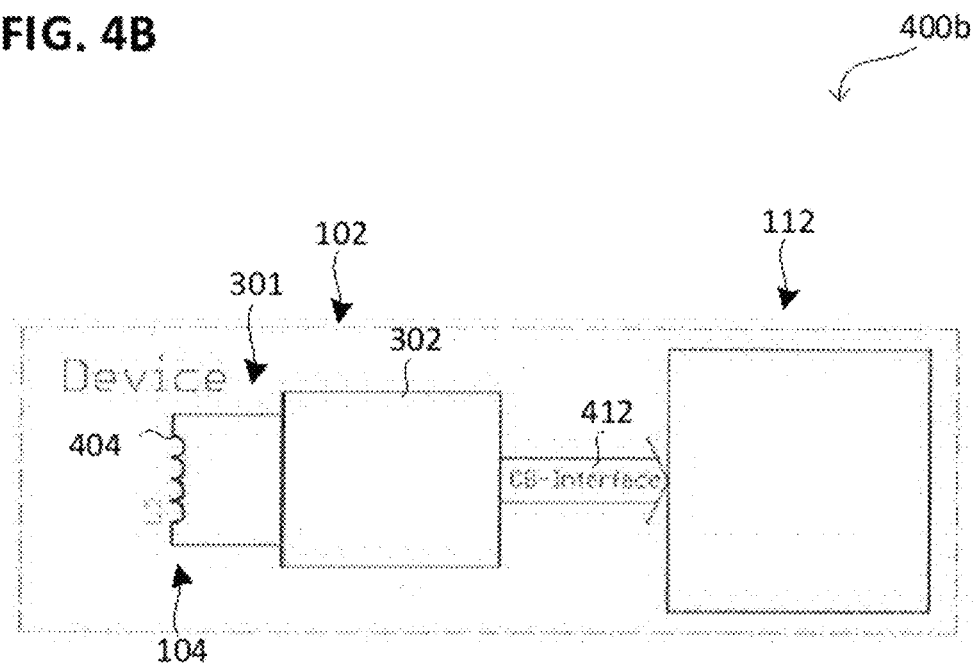

FIG. 4B illustrates a circuit arrangement 400a in accordance with various embodiments in a schematic view.

In accordance with various embodiments, the first circuit 102, or the chip 302 (e.g. in the form of a security chip), may include a contact communication interface (contact-based interface) coupled to the second circuit 112.

The electronic component 104 may include or be formed from a coil 304, wherein the coil 304 can have an inductance L2. The inductance L2 can be designed to be equal to the inductance L1. Alternatively, the inductance L2 can be designed to be different than the inductance L1.

In accordance with various embodiments, the coil 304, or the inductance thereof, is used exclusively for contactless communication, e.g. in the first operating mode.

Figure 5A:
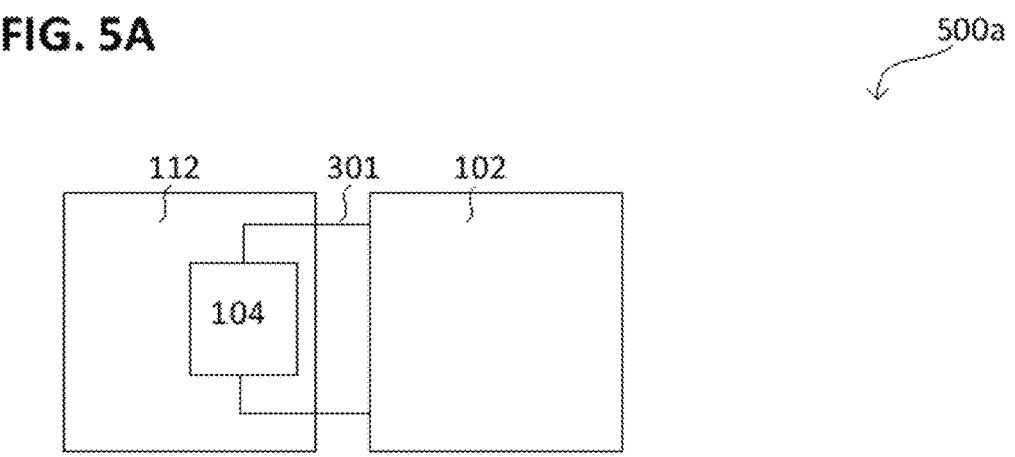
FIGS. 5A and 5B in each case show a circuit arrangement in accordance with various embodiments in a schematic view.

FIG. 5A illustrates a circuit arrangement 500a in accordance with various embodiments in a schematic view.

In accordance with various embodiments, the electrical component 104 can be part of the second circuit 112. In this case, the electrical component 104 can be e.g. part of a signal path of the second circuit 112. The signal path of the second circuit 112 can be designed e.g. for transferring the second electrical signal, e.g. at least in the second operating mode and optionally also in the first operating mode (e.g. if the first signal and the second signal are superimposed).

In this case, the electrical component 104 can be designed and used both for the operation of the first circuit 102, e.g. in the first operating mode, and for the operation of the second circuit 112, e.g. in the second operating mode.

Figure 5B:
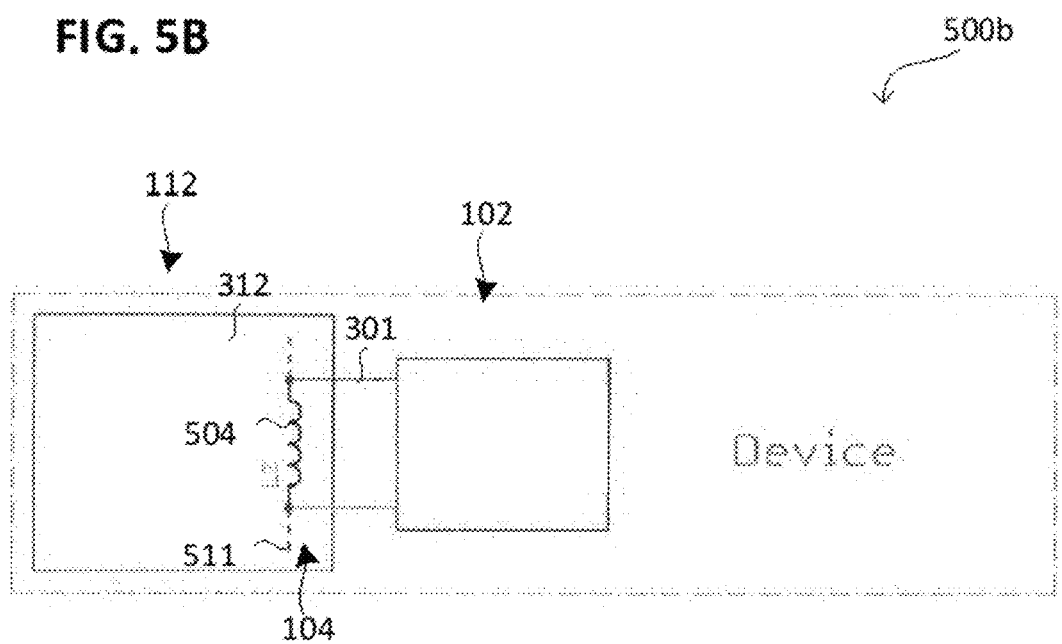

FIG. 5B illustrates a circuit arrangement 500a in accordance with various embodiments in a schematic view.

In accordance with various embodiments, the first circuit 102 may include or be formed from a chip 302 (e.g. a security chip) and the electrical component 104 may include or be formed from a coil 504, wherein the coil 504 can have an inductance L3. The coil 504 can be designed or operated as an antenna in the first operating mode.

The inductance L3 can be designed to be equal to the inductance L1. Alternatively, the inductance L3 can be designed to be different than the inductance L1.

The signal path 511 of the second circuit 112 can be designed e.g. for transferring the second electrical signal, e.g. within the second circuit 112. By way of example, the second electrical signal (for operation of the second circuit 112) can be transferred through the electrical component 104.

In other words, the inductance L3 can be used both for the rest of the circuit 112 and for the contactless communication.

Figure 6A:
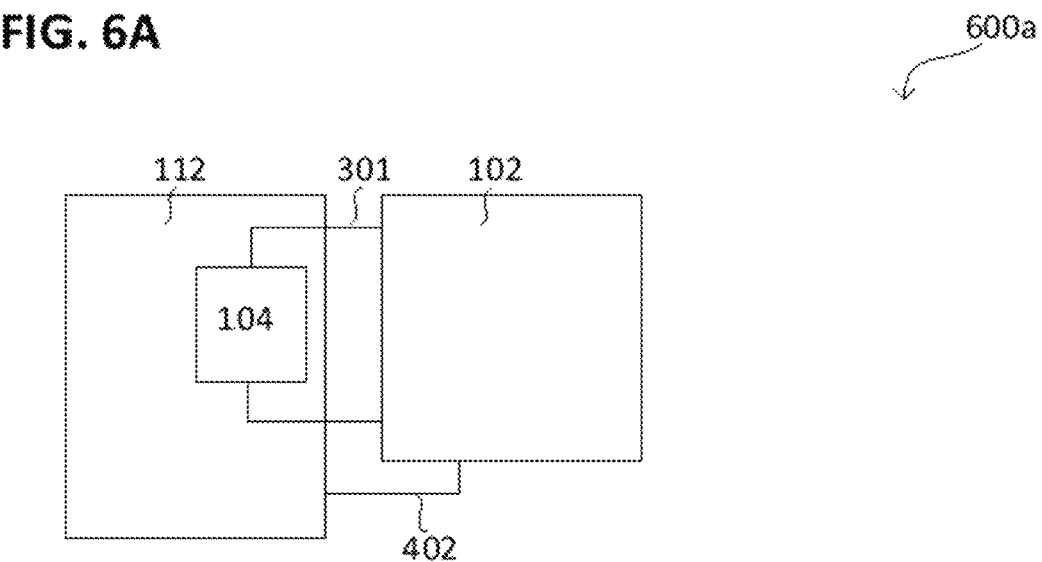
FIGS. 6A and 6B in each case show a circuit arrangement in accordance with various embodiments in a schematic perspective view.

FIG. 6A illustrates a circuit arrangement 600a in accordance with various embodiments in a schematic view.

In accordance with various embodiments, the first circuit 102 can be electrically conductively connected 301 to the electrical component 104, e.g. by a contactless communication interface. In addition, the first circuit 102 can be electrically conductively connected to the second circuit 112, e.g. by a contact communication interface.

Figure 6B:
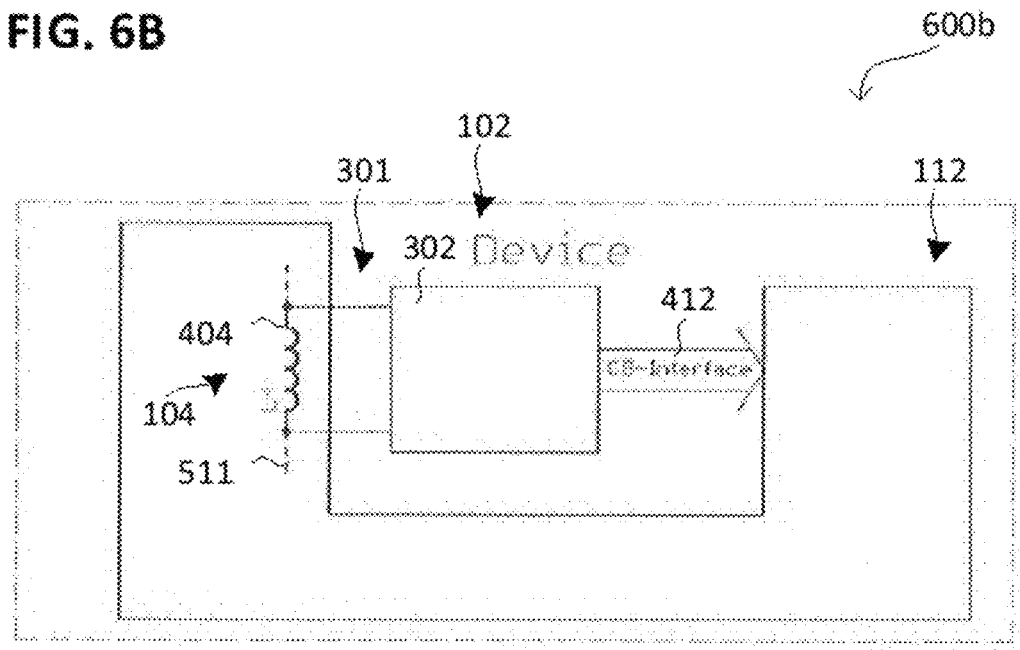

FIG. 6B illustrates a circuit arrangement 600b in accordance with various embodiments in a schematic view.

The electronic component 104 may include or be formed from a coil 604, wherein the coil 604 can have an inductance L4. The inductance L4 can be designed to be equal to the inductance L1. Alternatively, the inductance L4 can be designed to be different than the inductance L1. In accordance with various embodiments, the electronic component 104, or the coil 604, and/or the first circuit 102 can be integrated into the circuit arrangement 600b.

The electronic component 104, or the coil 604, can be designed for implementing the contactless communication, e.g. at least in the first operating mode.

In accordance with various embodiments, the first circuit 102, or the chip 302 (e.g. in the form of a security chip), may include a contact communication interface coupled to the second circuit 112. In addition, the first circuit 102, or the chip 302 (e.g. in the form of a security chip), may include a contactless communication interface coupled to the electronic component 104, or the coil 404.

By way of example, the inductance L4 and the first circuit 102, or the chip 302, can be completely integrated into the circuit arrangement 600b. The inductance L4 is designed for contactless communication and the contact-based interfaces of the first circuit 102, or of the chip 302, is designed for communication with the rest of the circuit arrangement 600b.

Figure 7A:
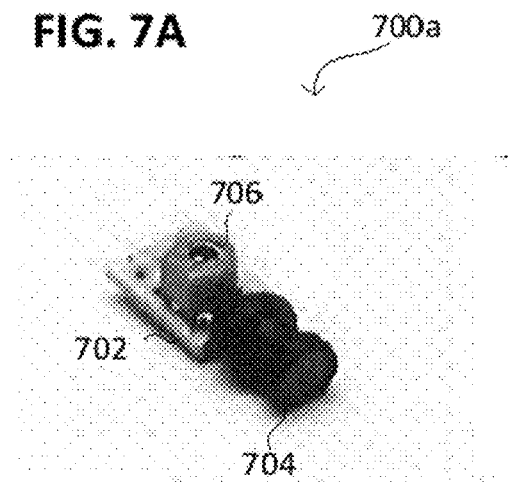
FIGS. 7A and 7B in each case show a circuit arrangement in accordance with various embodiments in a perspective view.
Figure 7B:
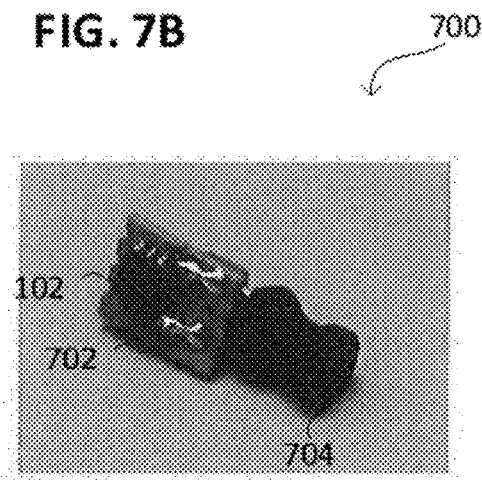

FIG. 7A and FIG. 7B in each case illustrate a circuit arrangement 700a in accordance with various embodiments in a schematic perspective view.

In accordance with various embodiments, the circuit arrangement 700a may include the following: a circuit board 702, a capacitor 706, a coil 704, and the first circuit 102 (e.g. in the form of an embedded circuit). The capacitor 706 and/or the coil 704 can be part of the electronic component 104 or can form the latter, e.g. in the form of a resonant circuit.

The capacitor 706, the coil 704, and/or the first circuit 102 can be arranged on the circuit board 702.

In accordance with various embodiments, the coupling of the electronic component 104 to the first circuit 102 can be effected in such a way that the electronic component 104 in a first operating mode together with the first circuit 102 implements the contactless communication.

The capacitor 706, the coil 704, and the first circuit 102 can be coupled to one another. By way of example, the circuit board 102 may include one or a plurality of conductor tracks that couple the capacitor 706, the coil 704, and the first circuit 102 to one another (e.g. in pairs), e.g. electrically conductively.

The first circuit 102 may include or be formed from a chip, e.g. a dual-interface chip (also designated as dual-interface controller).

Figure 7C:
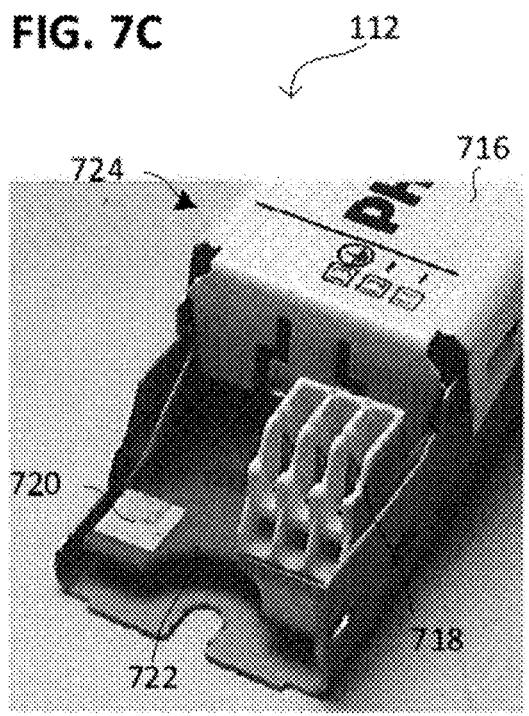
FIG. 7C shows a second circuit in accordance with various embodiments in a perspective view.

FIG. 7C illustrates a second circuit 112 in accordance with various embodiments in a schematic perspective view in a method for producing a circuit arrangement.

In accordance with various embodiments, the second circuit 112 may include an energy supply terminal 718 (e.g. in the form of a plug) for supplying the second circuit 112 with electrical energy; a functional region 724 (concealed by a housing 716 in the view), in which one or a plurality of electrical component parts are arranged which define its predefined functionality; a circuit board 722; and a configuration terminal 720 for configuring the second circuit 112.

The energy supply terminal 718, the configuration terminal 720, and the electrical component parts can be arranged on the circuit board 722. The circuit board 722 may include one or a plurality of conductor tracks that couple the energy supply terminal 718, the configuration terminal 720, and the electrical component parts to one another (e.g. in pairs), e.g. electrically conductively.

In accordance with various embodiments, the second circuit 112 can be designed for converting electrical energy and/or for supplying a load, e.g. a light source, with electrical energy. The second circuit 112 can then include a further energy supply terminal for providing electrical energy for the load and optionally at least one electrical component part in the form of a transformer. By way of example, the second circuit 112 may include or be formed from a ballast, e.g. for operating light sources, such as e.g. fluorescent tubes.

The configuration terminal 720 can be designed for configuring the second circuit 112 (e.g. for setting and/or for adapting). By way of example, the configuration terminal 720 can be designed for configuring a characteristic of the electrical energy provided by the second circuit 112 at the further energy supply terminal. By way of example, this can make it possible to configure an electrical power and adapt (or coordinate) it e.g. to the respective load.

The configuration terminal 720 may include for example small mechanical switches (also designated as DIP switches, "Dual in-line package" switches) which can provide a plurality of switching states and be switched in accordance with the characteristic of the electrical energy. Alternatively, the configuration terminal 720 may include a plug connection for programming the second circuit 112 by a programming unit connected to the plug connection.

Figure 7D:
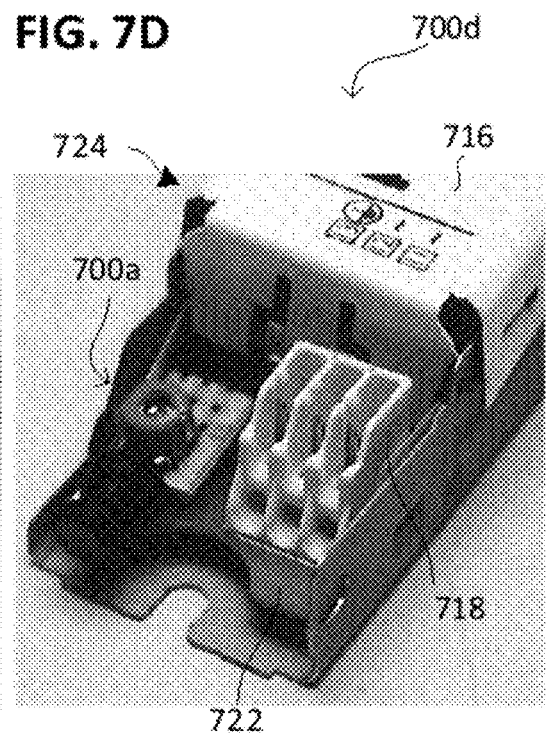
FIG. 7D shows a circuit arrangement in accordance with various embodiments in a perspective view.

FIG. 7D illustrates a circuit arrangement 700d in accordance with various embodiments in a schematic perspective view in a method for producing a circuit arrangement. In accordance with various embodiments, the first circuit 102 can be coupled to a configuration terminal 720 of the second circuit 112, e.g. electrically conductively (or alternatively, by means of some other coupling, as described above).

In accordance with various embodiments, the coupling of the electronic component 104 to the second circuit 112 can be effected in such a way that the electronic component 104 in a second operating mode together with the second circuit 112 implements the predefined functionality.

By way of example, the first operating mode may include or be formed from a configuration operating mode. The configuration operating mode can be designed for configuring the second circuit 102, e.g. for configuring the predefined functionality, e.g. on the basis of programming the second circuit 112 and/or on the basis of a plurality of switching states.

In other words, the configuration of the second circuit 112 can be effected contactlessly.

Figure 8A:
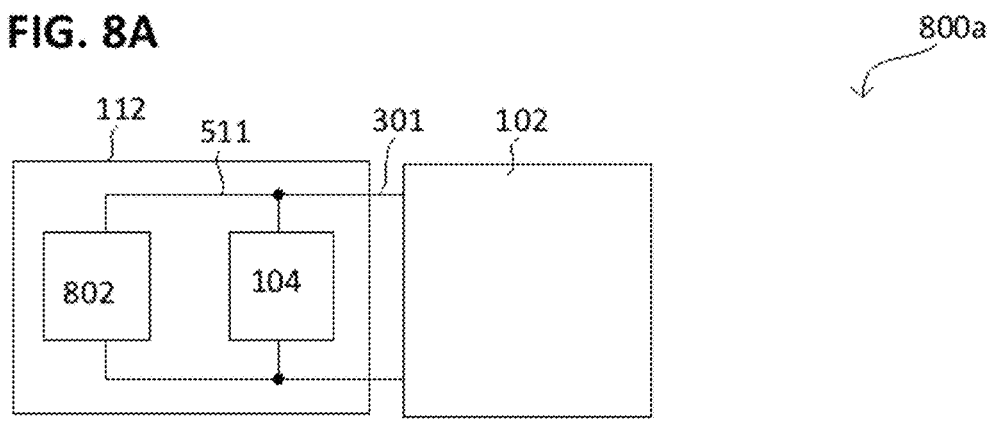
FIGS. 8A and 8B in each case show a circuit arrangement in accordance with various embodiments in a schematic view.

FIG. 8A illustrates a circuit arrangement 800a in accordance with various embodiments in a schematic view.

In accordance with various embodiments, the second electrical circuit 112 may include the following: at least one electrical component element 802 (e.g. one electronic component element 802 or a plurality of electronic component elements 802) which defines a predefined functionality, and a signal path 511 for supplying the electrical component element 802 with a second electrical signal.

The at least one electronic component element 802 can be coupled to the electrical component 104 by means of the signal route 511 (also designated as signal path 511), e.g. electrically conductively.

In the second operating mode, the electrical component 104 together with the second circuit 112, or the electronic component element 802, can implement the predefined functionality, e.g. if the second electrical signal is transferred along the signal route 511, e.g. if an electric current flows along the signal route 511.

Figure 8B:
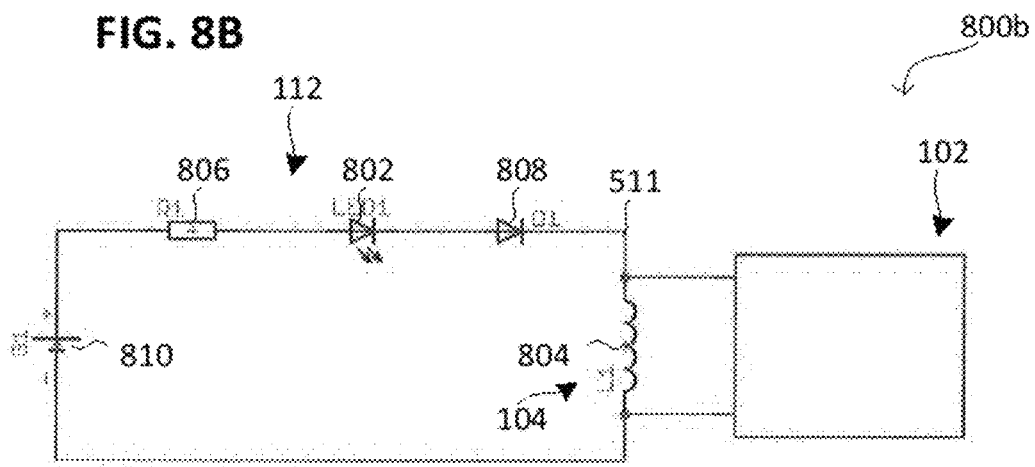

FIG. 8B illustrates a circuit arrangement 800b in accordance with various embodiments in a schematic view.

Optionally, the second electrical circuit 112 may include at least one further electrical component element 806, 808.

The at least one electrical component element 802 can e.g. include or be formed from a light source, e.g. a light emitting diode (LED). The at least one further electrical component element 806, 808 can e.g. include an ohmic impedance 806 and/or include a diode 808.

Optionally, the second circuit 112 may include an energy supply 810, e.g. a battery or a voltage source. By way of example, the second circuit 112 may include or be formed from a DC current circuit, e.g. an LED flashlight circuit. The electrical component 104 may include or be formed from a coil 804.

In accordance with various embodiments, the first circuit 102 can be electrically supplied by the second circuit 112, e.g. by the energy supply 810. In that case, the electrical component 104 can implement the contactless communication for transferring data (communication data), e.g. in the first operating mode. By way of example, the electrical component 104 can be designed to generate a first electrical signal on the basis of an (externally generated) alternating field, said first electrical signal including at least communication data (e.g. input data), and to transfer it to the first circuit 102. Alternatively or additionally, the electrical component 104 can be designed to generate and/or to modulate an alternating field on the basis of the first electrical signal, e.g. on the basis of the communication data (e.g. output data).

Alternatively, the first circuit 102 can be electrically supplied by the electrical component 104. In that case, the electrical component 104, in addition to the contactless communication for transferring data, can implement a contactless communication for supplying the first circuit 102 with energy (e.g. on the basis of the contactless communication), e.g. in the first operating mode. In other words, the electrical component 104 can be designed for generating an electrical signal and for transferring the electrical signal to the first circuit 102, which electrical signal supplies the first circuit 102 with energy (illustratively drives said first circuit).

In accordance with various embodiments, the output data may include or be formed from at least identification data (e.g. branding data). The identification data can enable e.g. a contactless identification or a contactless unambiguous assignment of the circuit arrangement 800b, or of a device including the circuit arrangement 800b.

Alternatively or additionally, the output data may include or be formed from at least authentication data. The authentication data can make possible e.g. an authentication of a user, e.g. for the unlocking and/or locking of a contactless controller (e.g. of a contactless lock), e.g. in order to restrict access to an area.

Figure 9A:
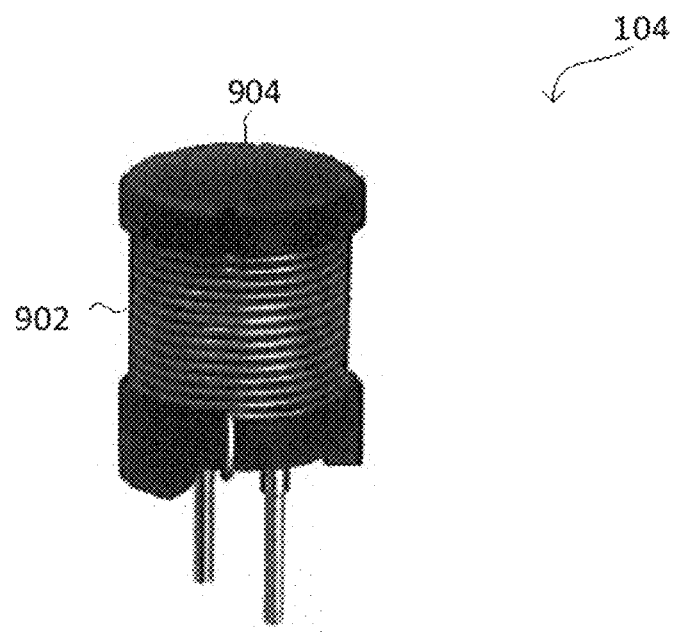
FIG. 9A shows an electronic component in accordance with various embodiments in a schematic perspective view.

FIG. 9A illustrates an electronic component 104 in the form of a coil in accordance with various embodiments in a schematic perspective view.

The electronic component 104 may include an electrical conductor including one or a plurality of windings (turns). Optionally, the electronic component 104 may include a ferromagnetic or ferrimagnetic core 904 around which the electrical conductor is wound.

In accordance with various embodiments, the electronic component 104 can be an electronic component part which has a standard inductance, i.e. its inductance is adapted to operation in a different circuit, e.g. the second circuit.

In the case of standard inductances L, use is made of the effect that their reactance $X_L$ increases as the frequency increases. $X_L = 2*pi*f*L$, wherein pi denotes the mathematical quantity and f denotes the frequency of an electrical signal present at the electronic component 104. As a result, electrical component elements having standard inductances L are suitable e.g. for filters (filter applications).

Figure 9B:
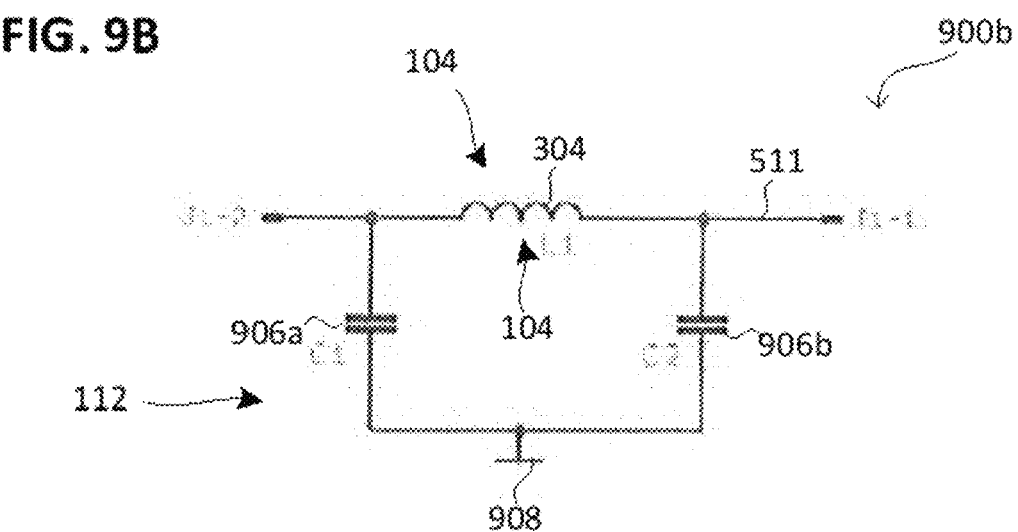
FIG. 9B shows a circuit arrangement in accordance with various embodiments in a schematic view.

FIG. 9B illustrates a circuit arrangement 900b in accordance with various embodiments in a schematic view.

In accordance with various embodiments, the circuit arrangement 900b, e.g. the second electrical circuit 112, may include a component element arrangement that defines the predefined functionality. The component element arrangement may include a plurality of component elements which implement the predefined functionality during operation (e.g. at least in the second operating mode), e.g. together with the electronic component 104.

The component element arrangement may include or be formed from, for example, a filter circuit (e.g. a pi filter). By way of example, the component element arrangement may include one or more capacitors 906a, 906b and can be coupled, e.g. electrically conductively connected, to an electrical ground 908 or to a terminal 908 of an energy supply. Together with the electronic component 104, e.g. in the form of a coil 304, the component element arrangement can implement a filter functionality (e.g. frequency filtering).

The arising of magnetic fields in filter circuits, e.g. as a result of the coil 304, may be a parasitic effect that is only slightly oriented toward the predetermined function of the filter circuit. In other words, the spatial distribution of the magnetic field generated has only a slight influence on the predefined functionality, as long as the inductance of the coil 304 remains unchanged. The generated magnetic field (e.g. an alternating magnetic field) can be used in accordance with various embodiments for implementing the contactless communication.

In accordance with various embodiments, a first electrical signal for operating the first circuit 102 (e.g. in the operating mode), e.g. a security chip, can have a first frequency in a first frequency range and a second electrical signal for operating the second circuit 112 (e.g. in the second operating mode), e.g. a filter circuit, can have a second frequency in a second frequency range. In accordance with various embodiments, the first frequency range and the second frequency range differ from one another. This makes it possible for the first electrical signal and the second electrical signal to be superimposed on one another, without these signals mutually interfering with one another. Simultaneous operation in the first operating mode and in the second operating mode can thus be implemented.

The second frequency range can be defined by the predetermined functionality. If a filter functionality is provided, for example, the second frequency range can depend on the frequencies to be filtered.

Figure 10:
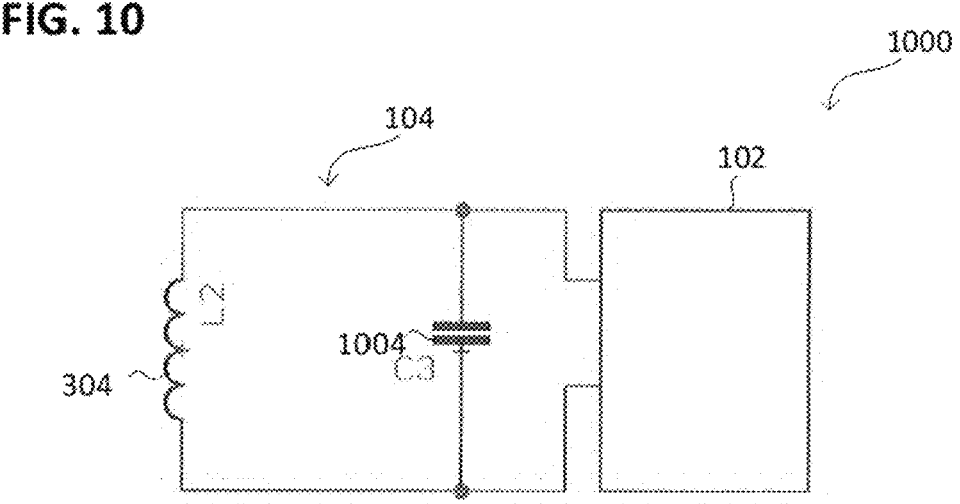
FIG. 10 shows a circuit arrangement in accordance with various embodiments in a schematic view.

FIG. 10 illustrates a circuit arrangement 1000 in accordance with various embodiments in a schematic view.

In accordance with various embodiments, the second circuit 112 may include an electrical component 104 including a plurality of electrical component elements, e.g. at least one coil 304 and at least one capacitor 1004. The electrical component elements of the electrical component 104 can be coupled to one another in such a way that they form a resonant circuit having a resonant frequency.

The coil 304 can have an inductance, as described above, e.g. equal to the first inductance L1.

If the inductance is designed in such a way that it is permeated by an external magnetic field, then an electrical signal (e.g. having an electrical voltage) is induced by the coil 304. If a matching capacitor 1004 is coupled to the coil, it is possible to produce a resonant circuit that is excited by said external magnetic field (e.g. to oscillate substantially at the resonant frequency). From this excitation, electrical energy for operating the first circuit 102, which may include or be formed from e.g. a contactless communication controller (contactless controller), can be obtained and fed thereto.

Alternatively or additionally, the contactless communication can be effected by means of the external magnetic field (externally generated magnetic field), e.g. by the latter being modulated, e.g. by load modulation.

In accordance with various embodiments, the above-described electrical components (including a coil) can alternatively or additionally include other electronic component elements, e.g. an ohmic impedance and/or a capacitor.

By way of example, in the case of an ohmic impedance, e.g. in the form of a wire-wound impedance, the contactless communication can be implemented on the basis of the parasitic inductance of the wire winding.

In accordance with various embodiments, the first circuit 102 can alternatively or additionally include or be formed from at least one other chip, e.g. an RFID chip (also designated as tag chip or radio label), e.g. a 13.56 MHz tag chip or a transponder chip.

In accordance with various embodiments, a contactless communication with the first circuit 102 can be established by an antenna, e.g. as part of a contactless controller (e.g. of a contactless reader). Alternatively, the resonant frequency in the first operating mode can be determined by means of the antenna, e.g. an Fres/Q antenna.

In accordance with various embodiments, it has been recognized that electronic components which are used in conventional circuits have parasitic effects which are suitable for implementing a contactless communication. Illustratively, the parasitic effects can be used for transferring data.

In accordance with various embodiments, a circuit arrangement is provided which illustratively is compact and/or requires low component part costs. By way of example, in accordance with various embodiments, the development of prototypes can be dispensed with.

In accordance with various embodiments, in a resource-saving manner it is possible to implement a contactless communication, e.g. in devices which have been specifically developed and optimized for a specific (e.g. communication-separate) application (i.e. are designed in accordance with a predefined functionality), without the latter having to be fundamentally altered. Illustratively, a contactless communication can be implemented in devices, for example, even though the latter have no space for a communication component part, such as e.g. an antenna.

In accordance with various embodiments, a circuit arrangement may include the following: a first circuit, which is designed for contactless communication; a second circuit, which is designed in accordance with a predefined functionality; at least one electronic component which in a first operating mode together with the first circuit implements the contactless communication and in a second operating mode together with the second circuit implements the predefined functionality.

In accordance with various embodiments, the at least one electronic component can be coupled to the first circuit and/or the second circuit, e.g. in such a way that the at least one electronic component in a first operating mode together with the first circuit implements the contactless communication and in a second operating mode together with the second circuit implements the predefined functionality.

In accordance with various embodiments, the circuit arrangement can be designed in such a way that the first operating mode and the second operating mode are implementable simultaneously.

Alternatively, the circuit arrangement in accordance with various embodiments can be designed in such a way that it is possible to switch between the first operating mode and the second operating mode.

In accordance with various embodiments, the first circuit can be designed for near field communication. In other words, the first circuit can be designed for contactless near field communication (e.g. NFC—near field communication).

In accordance with various embodiments, the second circuit can be designed for operation in a frequency range (also designated as second frequency range) that is different than the frequency for operation in the second operating mode.

In accordance with various embodiments, the second circuit can be a DC voltage circuit. In other words, operation in the second operating mode can be effected using (to put it another way on the basis of) a DC voltage.

In accordance with various embodiments, the first circuit and the second circuit can be electrically conductively connected to one another.

Alternatively, the first circuit and the second circuit in accordance with various embodiments can be galvanically isolated from one another. In other words, the first circuit and the second circuit can be designed to be potential-free in relation to one another. By way of example, the first circuit and the second circuit can be designed to be electrically insulated from one another, e.g. in such a way that no electric current flows between them, e.g. in the first operating mode and/or the second operating mode.

In accordance with various embodiments, the electronic component can comprise or be formed from at least one electrical component element from the following group of electrical component elements: a coil, a capacitor, an ohmic resistor.

In accordance with various embodiments, the electronic component may include a coil or be formed by a coil.

Alternatively, the electronic component in accordance with various embodiments may include a capacitor or be formed by a capacitor.

Alternatively, the electronic component in accordance with various embodiments may include an ohmic resistor or be formed by an ohmic resistor.

In accordance with various embodiments, the electronic component can be electrically conductively connected at least to the first circuit. Alternatively or additionally, the electronic component can be electrically conductively connected to the second circuit.

In accordance with various embodiments, the electronic component can be different than the first circuit and/or different than the second circuit. Alternatively, the electronic component can be at least part of the second circuit. In other words, a second electrical signal (for operating the second circuit) in the second operating mode, or for implementing the predefined functionality, can be present at the electronic component.

The predefined functionality can illustratively denote a function which is implemented (to put it another way realized) by the second circuit. The predefined functionality may include converting a first energy into a second energy. The first energy and/or the second energy are/is an electrical energy. The predefined functionality may include for example at least one (i.e. one or more) of the following: converting electrical energy into electromagnetic radiation (e.g. generating and/or emitting the electromagnetic radiation), converting electromagnetic radiation into electrical energy (e.g. detecting electromagnetic radiation), converting a first electrical energy characteristic into a second electrical energy characteristic, converting electrical energy into mechanical energy, converting mechanical energy into electrical energy, converting electrical energy into chemical energy, converting chemical energy into electrical energy, etc.

Alternatively or additionally, the predefined functionality may include at least one of the following: providing a plurality of circuit states, providing electrical energy having a predefined characteristic (electrical energy characteristic), storing data, detecting data, control, regulation, amplification, filtering, switching, delay, etc.

The predefined functionality can be e.g. different than a contactless communication.

The electromagnetic radiation may include or be formed from one or more wavelengths (e.g. discrete or continuous, i.e. a spectrum) from a range of wavelengths, e.g. from the visible range (visible wavelength range), from the infrared range and/or from the ultraviolet range. Electromagnetic radiation within the visible wavelength range can also be designated as light. Alternatively or additionally, the electromagnetic radiation may include or be formed from one or more wavelengths from the x-ray waveband, microwave range, etc.

The characteristic of electrical energy (electrical energy characteristic) may include at least one of the following: an electrical voltage, an electrical current, a frequency, an electrical power, a signal waveform (e.g. sinusoidal). Electrical energy can be transferred on the basis of an electrical signal having the electrical energy characteristic.

In accordance with various embodiments, the first circuit may include or be formed from at least one integrated circuit (also designated as monolithic circuit) (i.e. one integrated circuit or a plurality of integrated circuits). An integrated circuit (also designated as chip) may include or be formed from at least one electronic semiconductor component element. An integrated circuit may further include a semiconductor substrate, in and/or on which the at least one electronic semiconductor component element is formed. An integrated circuit can optionally be embedded into a plastic encapsulation.

In accordance with various embodiments, the second circuit may include or be formed from at least one integrated circuit. Alternatively or additionally, the second circuit can be formed on and/or in a printed circuit board. By way of example, the second circuit may include or be formed from a plurality of electronic component elements (e.g. electronic semiconductor component elements or electronic non-semiconductor component elements), which are arranged on and/or in a printed circuit board.

In accordance with various embodiments, the first circuit may include at least one electronic component element from the following group (i.e. one electronic component element, a plurality of electronic component elements or all electronic component elements): a memory element (e.g. for storing data), a processor (e.g. for reading out, writing and/or processing data), an input/output interface (e.g. for receiving or transmitting electrical signals), a digital/analog converter (e.g. for converting electrical signals into data and/or for converting data into electrical signals), an energy supply unit (e.g. for converting electrical signals into electrical energy with which the first circuit is supplied, e.g. into an electrical supply voltage). In accordance with various embodiments, the first circuit may include at least one of the electronic component elements from the group as a plurality thereof.

The memory element may include or be formed from at least one of the following: a rewritable memory element, a one time programmable memory element and/or a read-only memory.

The second circuit may include at least one electronic component element (e.g. as part of a component element arrangement including a plurality of component elements) which defines the predefined functionality, e.g. a light source, a transformer, a switch, an energy source (e.g. a battery), a sensor, a motor, etc.

In accordance with various embodiments, an electrical component element may have an electrical impedance which (e.g. at constant temperature) describes the ratio of the electrical voltage present at the electrical component element to the electrical current intensity taken up by the latter and is composed of a frequency-independent portion (also designated as effective resistance) and a frequency-dependent portion (also designated as reactance). This relationship can be understood for an electrical signal whose frequency is in a frequency range in which the spatial current density in the electrical component element (or an electrical conductor therein) is frequency-independent, i.e. in which no or a negligible skin effect occurs. By way of example, a frequency for the operation of the first circuit and/or a frequency for the operation of the second circuit can be in the frequency range.

In accordance with various embodiments, a coil (electrical coil) can be understood as an electrical component element whose electrical impedance is dominated by its reactance (e.g. at constant temperature and/or in the frequency range), that is to say that the ratio of reactance and effective resistance is greater than approximately 1, e.g. greater than approximately 5, e.g. greater than approximately 10, e.g. greater than approximately 20. The reactance of a coil can be defined by its inductance (also designated as inductive reactance), which describes the magnetic flux generated by the coil for an applied electrical current, and can increase as the frequency increases. A coil may include an electrical conductor whose cross section and length define the effective resistance and which includes one or more windings (turns), e.g. in a multilayered fashion. A coil may optionally include a ferromagnetic or ferrimagnetic core around which the electrical conductor is wound. Illustratively, a coil can be understood as an electrical component element which is designed for generating a magnetic field.

In accordance with various embodiments, a capacitor (electrical capacitor) can be understood as an electrical component element whose effective resistance substantially vanishes (e.g. at constant temperature and/or in the frequency range). The reactance of a capacitor can be defined by its electrical capacitance (also designated as capacitive reactance), which describes the quantity of electrical charge taken up (i.e. stored) by the capacitor for an applied electrical voltage (having a predefined value), and can decrease as the frequency increases, that is to say that the capacitor in DC current operation conducts substantially no current (apart from the electrical current which charges the capacitor initially). A capacitor may include two electrodes and a dielectric material that is arranged between the two electrodes and insulates the latter from one another. Illustratively, a capacitor can be understood as an electrical component element designed for storing an electrical charge.

In accordance with various embodiments, an ohmic impedance can be understood as an electrical component element whose electrical impedance is dominated by its effective resistance (e.g. at constant temperature and/or in the frequency range), that is to say that the ratio of effective resistance and reactance is greater than approximately 1, e.g. greater than approximately 5, e.g. greater than approximately 10, e.g. greater than approximately 20. In other words, the electrical impedance of an ohmic impedance is substantially dependent on the temperature thereof. An ohmic impedance may include an electrical conductor whose cross section and length define the effective resistance. Illustratively, an ohmic impedance can be understood as an electrical component element which is designed for setting a specific electrical current at a predefined electrical voltage (e.g. in DC current operation and/or AC current operation).

In the case of a linear conductor, the reactance of an ohmic impedance can substantially vanish. In accordance with various embodiments, in the case of an ohmic impedance (e.g. in order to achieve large electrical impedances) it may be necessary to form the electrical conductor thereof in a space-saving manner, for which reason the latter can be formed in a spiral shape, i.e. e.g. can be wound around the (nonmagnetic) core (this is also designated as a wire-wound impedance), e.g. in a monolayer fashion.

The electronic component can have an inductance and/or a capacitance. The contactless communication can be implemented on the basis of the inductance and/or the capacitance. By way of example, the ohmic impedance can also have an inductance and/or a capacitance, e.g. if it includes a wound conductor.

A method for operating a circuit arrangement may include the following: operating the circuit arrangement in a first operating mode. The electronic component in the first operating mode together with the first circuit implements a contactless communication. The method may further include operating the circuit arrangement in a second operating mode. The electronic component in the second operating mode together with the second circuit implements a predefined functionality.

In accordance with various embodiments, operating the circuit arrangement in a first operating mode can be effected using a contactless controller designed for contactless communication, e.g. for communicating with the first circuit, e.g. for transferring data on the basis of the contactless communication. For this purpose, the contactless controller may include a transmitter and/or a receiver designed for contactless communication (e.g. an antenna).

In accordance with various embodiments, operating the circuit arrangement in a first operating mode may include transferring data to or from the first circuit, e.g. on the basis of the contactless communication. Alternatively or additionally, operating the circuit arrangement in a first operating mode may include transferring electrical energy to or from the first circuit e.g. on the basis of the contactless communication. Alternatively or additionally, operating the circuit arrangement in a first operating mode may include transferring an alternating field to or from the first circuit.

In accordance with various embodiments, operating the circuit arrangement in a first operating mode can be effected using a near field communication. In that case, the contactless controller and the circuit arrangement (e.g. at least in the first operating mode) can have a distance of less than 10 cm. In various embodiments, the contactless controller and the circuit arrangement (e.g. at least in the first operating mode) can have a distance of less than approximately 1 m (for example in the case of boosted NFC), for example a distance of less than approximately 0.9 m, for example a distance of less than approximately 0.8 m, for example a distance of less than approximately 0.7 m, for example a distance of less than approximately 0.6 m, for example a distance of less than approximately 0.5 m, for example a distance of less than approximately 0.4 m, for example a distance of less than approximately 0.3 m, for example a distance of less than approximately 0.2 m, for example a distance of less than approximately 0.1 m.

In accordance with various embodiments, operating the circuit arrangement in the second operating mode can be effected using a DC voltage.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement, comprising:
   a first circuit, which is designed for contactless communication and comprises a smart card controller;
   a second circuit, which is designed in accordance with a predefined functionality;
   at least one electronic component which in a first operating mode together with the first circuit implements the contactless communication for receiving electrical energy and supplying the received electrical energy to the first circuit;
   and in a second operating mode together with the second circuit implements the predefined functionality;
   wherein the at least one electronic component is designed for operation as an antenna in the first operating mode;
   wherein the second circuit is configured to operate in a frequency range that is distinct from an operational frequency of the first operating mode.

2. The circuit arrangement of claim 1,
   wherein the at least one electronic component is coupled to the first circuit and the second circuit.

3. The circuit arrangement of claim 1,
   wherein the circuit arrangement is designed in such a way that the first operating mode and the second operating mode are implementable simultaneously.

4. The circuit arrangement of claim 1,
   wherein the circuit arrangement is designed in such a way that it is possible to switch between the first operating mode and the second operating mode.

5. The circuit arrangement of claim 1,
   wherein the first circuit is designed for near field communication.

6. The circuit arrangement of claim 1,
   wherein the second circuit is a DC voltage circuit.

7. The circuit arrangement of claim 1,
   wherein the first circuit and the second circuit are electrically conductively connected to one another.

8. The circuit arrangement of claim 1,
   wherein the first circuit and the second circuit are galvanically isolated from one another.

9. The circuit arrangement of claim 1,
   wherein the electronic component comprises a coil or is formed by a coil.

10. The circuit arrangement of claim 1,
    wherein the electronic component comprises a capacitor or is formed by a capacitor.

11. The circuit arrangement of claim 1,
    wherein the electronic component comprises an ohmic resistor or is formed by an ohmic resistor.

12. The circuit arrangement of claim 1,
wherein the predefined functionality is a filter functionality or a switching functionality.

13. The circuit arrangement of claim 1,
wherein the predefined functionality comprises at least one of the following: providing a plurality of circuit states, providing electrical energy, storing data, detecting data, controlling, regulation, amplification, filtering, switching, and/or delay.

14. The circuit arrangement of claim 1,
wherein the second circuit includes at least one of the following: a light source, a transformer, a switch, an energy source, a battery, a sensor, and/or a motor.

15. The circuit arrangement of claim 1,
wherein the first electrical circuit includes or is formed from a smart card controller.

16. The circuit arrangement of claim 1,
wherein the first electrical circuit includes or is formed from a dual-interface controller.

17. A circuit arrangement, comprising:
a first circuit, which is designed for contactless communication and comprises a smart card controller;
a second circuit, which is designed in accordance with a predefined functionality;
at least one electronic component which in a first operating mode together with the first circuit implements the contactless communication for receiving electrical energy and supplying the received electrical energy to the first circuit;
and in a second operating mode together with the second circuit implements the predefined functionality;
wherein the at least one electronic component is designed for operation as a transceiver in the first operating mode,
wherein the second circuit is configured to operate in a frequency range that is distinct from an operational frequency of the first operating mode.

18. A circuit arrangement, comprising:
a first circuit, which is designed for contactless communication and comprises a smart card controller;
a second circuit, which is designed in accordance with a predefined functionality;
at least one electronic component which in a first operating mode together with the first circuit implements the contactless communication for receiving electrical energy and supplying the received electrical energy to the first circuit;
and in a second operating mode together with the second circuit implements the predefined functionality;
wherein the at least one electronic component is formed from an ohmic resistor, a capacitor or a coil;
wherein the second circuit is configured to operate in a frequency range that is distinct from an operational frequency of the first operating mode.

* * * * *